United States Patent Office

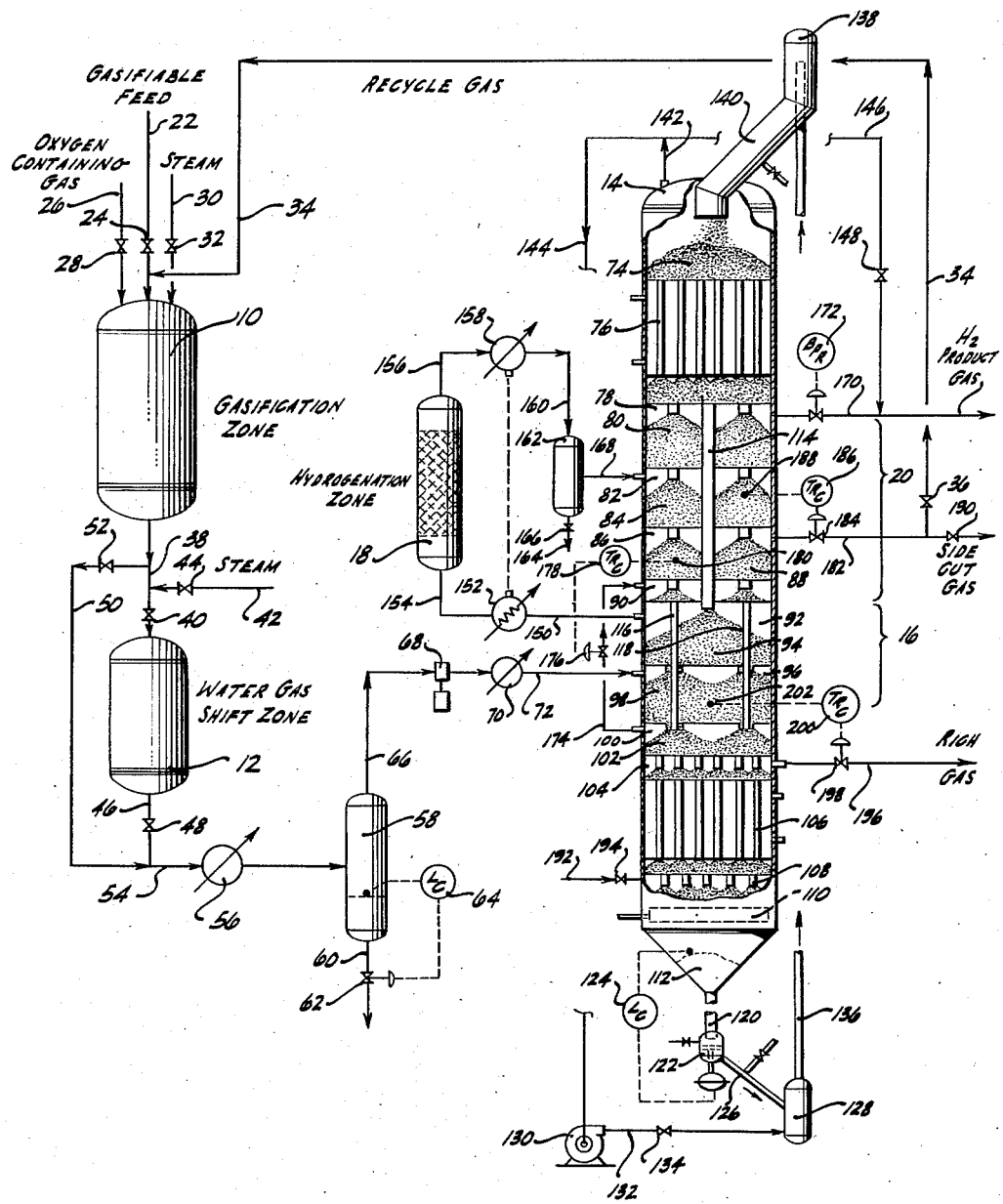

2,759,799
Patented Aug. 21, 1956

2,759,799

HYDROGEN PRODUCTION PROCESS AND APPARATUS

Clyde H. O. Berg, Long Beach, Calif., assignor to Union Oil Company of California, Los Angeles, Calif., a corporation of California Application August 4, 1952, Serial No. 302,546

19 Claims. (Cl. 23—213)

This invention relates to the production and purification of hydrogen and in particular relates to an improved process and apparatus for the preparation of high purity hydrogen substantially free of carbon monoxide, oxygen, and carbon dioxide in which a minimum number of treating and purification steps are employed.

Hydrogen is used industrially in large quantities in many commercial operations such as the petroleum refining processes of reforming, hydrogenation, desulfurization, denitrogenation, and the like. In other industrial processes such as ammonia synthesis, the hydrogenation of liquid oils to produce solid fats, metal treating using reducing atmospheres, and the like, extremely high purity hydrogen is required.

The conventional hydrogen production processes include electrolysis of water, the decomposition of steam with hot iron or hot ferrous oxide, thermal or catalytic cracking of hydrocarbons, the reforming of hydrocarbons with steam, the gasification of carbonaceous materials such as coke, coal, and other carbonaceous solids using steam and oxygen, the catalytic reaction of methanol with steam, catalytic decomposition of ammonia, the catalytic dehydrogenation of hydrocarbons, the reaction of ferrosilicon with caustic soda, and others.

Of these known processes, those of water electrolysis, reaction of methanol and steam, the catalytic decomposition of ammonia, and the reaction of ferrosilicon with caustic soda are relatively expensive. Usually industrial hydrogen is produced by the steam iron process, the gasification of carbonaceous materials with steam and air, and the steam reforming of hydrocarbon vapors or gases and are the processes most commonly employed to produce commercially large quantities of hydrogen. These processes, however, produce product hydrogen which usually contains varying quantities of contaminants such as carbon monoxide, carbon dioxide, residual hydrocarbon gases, and the like. Although in many hydrogenation processes the residual hydrocarbons are usually inert materials, they are undesirable in many instances. With respect to carbon monoxide, it is particularly undesirable since it is an active poison to the well-known hydrogenation catalysts such as platinum, palladium, nickel, and the like.

It has heretofore been the practice to remove carbon monoxide and hydrocarbon impurities from the raw hydrogen-containing gas by subjecting this gas to a water gas shift reaction in which the carbon monoxide and hydrocarbon impurities are catalytically reacted with steam to produce hydrogen and carbon dioxide. It is usual to obtain about a 90% carbon monoxide conversion. The thus treated gas is then subjected to an alkaline extraction of the carbon dioxide using any of the well-known alkaline solvents such as sodium carbonate, caustic soda, the mono- and diethanol amines, and the like. Due to the fact that only about 90% conversion of the carbon monoxide occurs, a substantially carbon monoxide-free hydrogen stream is obtainable only by repeated water gas shift treatment and alkaline extraction using as many as 3 or 4 of such separate treating steps. High purity hydrogen, therefore, is obtained by using a complex expensive process in which many separate treating steps are required.

The present invention is directed therefore to a process for the production of hydrogen in commercial quantities which eliminates repetitious treating operations and yet produces high purity hydrogen substantially free of carbon monoxide and hydrocarbon contaminants.

It is the primary object of this invention to provide a process for the high efficiency production of low-cost hydrogen having substantially less than 5 parts per million of carbon monoxide, oxygen, and hydrocarbon contaminants.

It is another object of this invention to provide for the adsorptive fractionation of a raw hydrogen-containing gas contaminated with hydrocarbons, oxygen, carbon dioxide, carbon monoxide, and the like whereby the more readily adsorbable constituents are first separated, the carbon monoxide and oxygen contaminants are catalytically hydrogenated to form methane and water, and then these products are adsorptively separated to produce an extremely high purity hydrogen product.

A more specific object of this invention is a combination process in which a raw hydrogen-containing gas is produced, carbon dioxide, water vapor, methane, and the like are separated therefrom, then the oxygen, carbon monoxide, and residual carbon dioxide are hydrogenated to water and methane, and finally the water and methane are adsorbed from the pure hydrogen.

Another specific object of this invention is to provide a process in which a carbonaceous or hydrocarbonaceous material is reacted with steam to produce a raw hydrogen-containing gas mixture, the gas mixture is subjected to a first adsorption step leaving a hydrogen stream contaminated with carbon monoxide and oxygen, these contaminants are hydrogenated with part of the hydrogen in the gas stream to be purified, and then a second adsorption step in the same adsorption column adsorptively separates the hydrogenated products from a substantially pure hydrogen stream.

Another object is to provide a process according to the preceding object in combination with the isolation of a substantially pure hydrocarbon contaminant stream which is recycled for reforming with steam to produce additional quantities of hydrogen.

A further object is to provide an improved apparatus for effecting the foregoing objects.

Briefly, the present invention comprises a combination process for the production of high purity hydrogen in which a hydrocarbon gas or vapor is reformed with steam or a carbonaceous solid material is gasified with steam and an oxygen-containing gas to produce a crude impure gaseous mixture containing a substantial quantity of hydrogen and which is contaminated with such materials as carbon monoxide, carbon dioxide, methane, and other unreacted hydrocarbons, water vapor, nitrogen, and the like.

Solid carbonaceous or hydrocarbonaceous materials are gasified at temperatures between about 1000° F. and 3000° F. and usually between about 1500° F. and about 2200° F. by the alternate oxidation with air, oxygen, enriched air, or pure oxygen and reduction with steam or a water vapor containing gas to produce a gaseous mixture containing usually less than about 5% carbon dioxide, about 40% to 45% carbon monoxide, between about 45% and 55% hydrogen, less than 5% nitrogen, and some hydrocarbon gases such as methane. Such solid carbonaceous or hydrocarbonaceous materials may also be gasified with steam on a continuous basis by supplying a continuous stream of such solid materials and treating them at the temperatures named with a gas containing both steam and oxygen producing a gas containing 5–15% carbon dioxide, 15–30% carbon monoxide, 15–25% hydrogen, 45–55% nitrogen (when using air), and a few percent methane. The pressure of either of these operations may be at or about that of the atmosphere or as high as 250 p. s. i. g. (pounds per square inch gauge) or higher. The operation is conventionally performed at about 100 p. s. i. g.

Hydrocarbon vapors or gases may be reformed with steam to produce a crude impure hydrogen-containing gas by reacting a mixture of hydrocarbon vapor or gas, such as natural gas, methane, ethane or propane, etc., with steam at temperatures between about 1200° F. and 2000° F. in the presence of a catalyst such as nickel. For methane the reaction is:

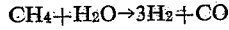
$$CH_4 + H_2O \rightarrow 3H_2 + CO$$

and the reactions of the higher molecular weight hydrocarbons are analogous. The nickel catalyst may be so-called massive nickel such as nickel punchings, borings, or shot when the process is performed at temperatures of about 1500° F. to 2000° F. At temperatures between about 1200° F. and 1500° F. the catalyst is preferably a supported nickel catalyst, for example, nickel impregnated on activated carbon or another of the well-known relatively inert catalyst carriers. Hydrocarbon reforming with steam may also be effected at the same pressures given above. A crude impure hydrogen-containing gas is also produced which contains considerable quantities of carbon monoxide as a contaminant.

This crude hydrogen-containing gas may be subjected to a water gas shift reaction in which the carbon monoxide contaminant and any residual hydrocarbon contaminants are reacted with steam at a temperature of between 600° F. and 1000° F. and at a pressure of between about atmospheric to 250 p. s. i. g. such as about 100 p. s. i. g. In the presence of a catalyst, which may comprise iron oxide, between about 90% and 95% of the carbon monoxide contaminant is reacted with the steam to produce carbon dioxide and additional hydrogen according to the reaction:

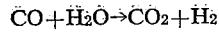
$$CO + H_2O \rightarrow CO_2 + H_2$$

When such a water gas shift treatment is employed, the carbon monoxide content of the crude gaseous mixture is reduced to about 1.5%, a substantial reduction in the quantity of hydrocarbon contaminants may also be effected and a gas produced containing about 75% hydrogen and 15–20% carbon dioxide.

In the present invention, the water gas shift treatment is desirable but may be omitted under certain operating situations, such as where only small amounts of carbon monoxide are present, and the crude hydrogen-containing gas be directly subjected to the two-stage adsorptive separation of the gaseous mixture and the intermediate catalytic hydrogenation of carbon monoxide and any oxygen contaminants present.

The combination adsorptive separation and catalytic hydrogenation step referred to itself constitutes a highly desirable gas treating and separation process independently of the gasification and water gas shift steps discussed above and may be used to advantage in combination with the other processes referred to in which crude hydrogen-containing gaseous mixtures are produced.

In general, the crude gaseous mixture or the gaseous mixture produced from the water gas shift operation will contain hydrogen in amounts up to about 80% to 90% by volume and also contain other gaseous constituents such as oxygen, carbon monoxide, nitrogen, carbon dioxide, methane, and other hydrocarbons and water vapor, and the like. This gaseous mixture is passed into the first separation zone of a selective adsorption column wherein it is contacted with a downwardly moving bed of solid granular adsorbent such as activated charcoal, activated aluminum oxide, silica gel, or any of the other well-known solid adsorbents exhibiting gaseous adsorption activity. Preferably highly activated vegetable charcoal is employed such as that prepared from coconut hulls, fruit pits such as apricot and peach pits, or shell charcoal such as that prepared from walnut shells, and the like. The more readily adsorbable constituents of the gaseous mixture are adsorbed such as the methane, carbon dioxide and water vapor leaving hydrogen, carbon monoxide, and any oxygen or nitrogen substantially unadsorbed. In a slight modification, the carbon dioxide and water vapor may be adsorbed leaving hydrogen, carbon monoxide, nitrogen, and methane unadsorbed and the methane is later produced as a separate stream. In any event, the rich adsorbent containing the adsorbed constituents is indirectly heated and stripped with a stripping gas forming a rich gas product containing the desorbed constituents leaving a hot lean adsorbent. The unadsorbed gases including hydrogen, carbon monoxide, and sometimes nitrogen, oxygen and methane, depending upon the type of operation desired, is removed from the first separation zone as a substantially unadsorbed first lean mixture.

In the first separation zone a relatively small quantity of solid granular adsorbent per unit volume of impure hydrogen-containing gas is required due to the relatively low concentration of hydrocarbons, carbon dioxide, and water vapor compared to that of the relatively unadsorbable gases such as hydrogen and carbon monoxide. The exothermic heat of adsorption liberated in the first separation zone when the more readily constituents are adsorbed is carried upwardly through the downwardly moving bed of adsorbent in the first separation zone when, as is usually the case in this process, the product of the mass flow rate and the specific heat of the unadsorbed gas is greater than the product of the mass flow rate and the specific heat of the adsorbent flowing countercurrent to one another in the first separation zone. When such a condition exists the liberated heat of adsorption is not carried down the column by the moving bed of adsorbent forming a sharp temperature gradient or break, but is carried up the column by the unadsorbed gases which are removed therefrom at temperatures between 150° F. and about 250° F.

The discovery of this phenomenon contributes to the efficiency of the process of this invention and effectively supplies a substantial proportion of the preheat necessary prior to the catalytic hydrogenation of the oxygen and carbon monoxide contaminants in the first lean gas produced from the first separation zone. It is also applicable to other adsorptive separations where the unadsorbed gases are to be treated subsequently at a higher temperature.

The thus preheated first lean gas is additionally heated to temperatures between about 400° F. and about 700° F. and is passed in direct contact with a hydrogenation catalyst such as platinum on alumina or other suitable catalyst. A portion of the hydrogen present in the first lean gas stream is consumed in the catalytic hydrogenation of oxygen, carbon monoxide, and carbon dioxide to produce water vapor and methane. The catalytic hydrogenation of oxygen, carbon monoxide, and carbon dioxide is substantially quantitative and the effluent gas from the intermediate hydrogenation zone contains less than 5 parts per million of carbon monoxide and carbon dioxide and consists essentially of hydrogen contaminated with methane and water vapor and nitrogen, if present. Incidentally, air may be used in gasification so as to produce an ultimate product containing 25% by volume nitrogen and free of carbon monoxide for the synthesis of ammonia.

This effluent gas from the intermediate hydrogenation zone is cooled by heat interchange with the first lean gas entering the hydrogenation zone, is subsequently cooled to about 100° F. by conventional water cooling or other means, and is then refrigerated to a subatmospheric temperature of about 40° F. This refrigerated hydrogenation zone effluent constitutes the feed gas to the second separation zone in the selective adsorption process of this invention and contains methane, water vapor, and hydrogen, sometimes nitrogen as well.

The refrigerated secondary feed gas is countercurrently contacted with a second downwardly moving bed of solid granular adsorbent in a quantity sufficient to adsorb selectively the water vapor, methane and any more readily adsorbable constituents of the secondary feed gas forming a second rich adsorbent containing these materials and leaving a substantially unadsorbed high purity stream of hydrogen as a second lean gas from the selective adsorption operation. This product gas contains between about 0.5 to about 5.0 parts per million of residual carbon monoxide and constitutes completely pure hydrogen for nearly all present day processes requiring high purity hydrogen. The stated degree of carbon monoxide contamination is well below that which poisons the well-known hydrogenation catalysts.

As in the first separation zone, the product of the specific heat and mass flow rate of the unadsorbed gas is greater than the product of the specific heat and mass flow rate of the adsorbent and the heat liberated from methane and water vapor adsorption is carried upward warming the gases from the subatmospheric temperature of about 40° F. to about 100° F. at which temperature the second lean gas, which is the hydrogen product, is removed from the process. No sharp temperature break is formed in the secondary adsorption zone. The degree of cooling and refrigeration of the secondary feed is controlled, varying with the amount of gases to be adsorbed and the heat liberated due to adsorption, so that the hydrogen product is removed at about an atmospheric temperature, e. g., between about 50° F. and about 110° F.

The second moving bed of rich adsorbent may be countercurrently contacted with a reflux gas of more readily adsorbable constituents such as carbon dioxide, water vapor, and the like, thereby preferentially desorbing adsorbed methane in substantially pure form as a side cut gas product from the second separation zone. In a combination process wherein hydrocarbon gases or vapors are reformed with steam as discussed above this side cut gas product of hydrocarbons is recycled to the hydrocarbon-steam reforming zone and thus permits a 100% conversion of hydrocarbons.

In another modification, the adsorbed methane and hydrocarbons, if not desired as a pure stream, may be adsorbed on the adsorbent and desorbed with the carbon dioxide and water vapor in the rich gas product discussed above.

The two separate adsorption steps and the intermediate hydrogenation step may be carried out successfully under wide ranges of pressures such as atmospheric or below to as high as 800 or 1000 p. s. i. g., the pressures do not appear to be critical. Hydrogen readily reacts over platinum with carbon monoxide, carbon dioxide, and oxygen at temperatures given even at atmospheric pressure and the adsorptive separations of hydrogen from methane, carbon dioxide, etc. and of methane from carbon dioxide proceed readily at atmospheric pressures. At the higher pressures, such as about 100 p. s. i. g., less adsorbent per unit feed gas volume is required, and the recycle side cut gas need not be compressed appreciably for recirculation and the whole process may operate economically at the same pressure.

The two stages of adsorptive fractionation may be effected in separate adsorption columns. However, it has been found much more desirable, in view of the fact that additional water and methane are formed in the intermediate hydrogenation zone, to employ a specially developed double adsorption column in which two separate adsorbent streams contact the first and second feed gases and then the streams are combined. The carbon dioxide and water vapor are desorbed together from the combined stream and, if desired, a methane side cut stream may be produced for recirculation from one of the adsorbent streams. This operation is more clearly described in connection with the drawing.

The process and apparatus of the present invention and particularly the combination two-stage selective adsorption operation and the intermediate hydrogenation step may be more clearly understood by reference to the accompanying drawing which is a schematic flow diagram in which the structural details of the adsorption and hydrogenation apparatus are clearly shown.

Referring now more particularly to the drawing, the process is provided with a gasification zone 10, a water gas shift zone 12, a selective adsorption column 14 provided with a first separation zone indicated generally at 16, and a second separation zone in selective adsorption column 14 indicated generally at 20. The intermediate hydrogenation zone 18 treats gas flowing from first separation zone 16 and introduces it into second separation zone 20.

A gasifiable feed, which may comprise a hydrocarbon gas or vapor or a gasifiable carbonaceous or hydrocarbonaceous solid, is introduced into gasification zone 10 through line 22 at a rate controlled by valve 24. When a carbonaceous or hydrocarbonaceous solid material is employed as the gasifiable feed, an oxygen-containing gas is introduced through line 26 at a rate controlled by valve 28. Steam is injected either intermittently or continuously through line 30 controlled by valve 32. When the gasifiable feed comprises a hydrocarbon gas or vapor, the oxygen-containing gas may or may not be added but steam is introduced, usually continuously, through line 30. Any recycle hydrocarbon gas is also introduced through line 34 at a rate controlled by valve 36. The gasifiable feed and the steam and the oxygen-containing gas, when employed, are reacted under the temperature and pressure conditions given above in gasification zone 10 to produce a gaseous mixture containing hydrogen, oxygen, carbon monoxide, carbon dioxide, methane and higher molecular weight hydrocarbons, and water vapor. If air is employed as the oxygen-containing gas or the hydrogen is otherwise generated in the presence of nitrogen by reforming a hydrocarbon with steam in the presence of air, nitrogen is present in the effluent from the gasification zone and its concentration may be controlled by obvious means to equal 33.3% of the hydrogen product thus producing a 25% nitrogen 75% hydrogen gas suitable for synthetic ammonia production.

The raw impure hydrogen-containing gas then passes through line 38 at a rate controlled by valve 40 and is cooled by the addition of steam through line 42 controlled by valve 44. The mixture passes into water gas shift zone 12 together with the additional steam. In some instances, the additional steam may not be required due to an excess which may be introduced through line 30 into the gasification zone in which case the gasification zone effluent is indirectly cooled. In water gas shift zone 12 and under the temperature and pressure conditions given above, water vapor reacts with carbon monoxide to produce carbon dioxide and additional hydrogen in the presence of a catalyst such as iron oxide. The water gas shift zone effluent, containing only a few percent carbon monoxide contaminant, is discharged therefrom through line 46 at a rate controlled by valve 48. In some instances it may not be necessary to operate the water gas shift zone and the crude gasification zone effluent may be treated in the subsequent steps of this process in which case it is by-passed through line 50 controlled by valve 52 around the water gas shift zone.

In either case the gaseous mixture is introduced through line 54 into gas cooler 56 wherein a substantial proportion of the water vapor is condensed and separated in separator 58. The condensate is removed therefrom through line 60 at a rate controlled by valve 62 in accordance with liquid level controller 64. The cool and at least partially dehydrated hydrogen-containing gas then passes through line 66 and compressor 68. Adsorption column pressures are not critical and a pressure of between about atmospheric and 500 p. s. i. .g or higher may be used. Desirably the pressure is at or near that of the gasification and shift zone operating pressures. The compressed primary feed gas is then cooled in feed gas cooler 70 and then passes through line 72 into the first separation zone of selective adsorption zone 14 subsequently described.

Selective adsorption zone 14 consists of a single vertical pressure resistant column provided at successively lower levels with adsorbent hopper zone 74, lean adsorbent cooling zone 76, secondary lean gas or hydrogen product disengaging zone 78, secondary adsorption zone 80, secondary feed gas engaging zone 82, first secondary rectification zone 84, side cut gas disengaging zone 86, second secondary rectification zone 88, secondary reflux gas engaging zone 90, first lean gas disengaging zone 92, first adsorption zone 94, primary feed gas engaging zone 96, first primary rectification zone 98, secondary reflux gas disengaging zone 100, main rectification zone 102, rich gas product disengaging zone 104, rich adsorbent heating and desorption zone 106, stripping gas engaging zone 108, adsorbent feeder zone 110, and bottom zone 112.

The granular adsorbent introduced into the top of selective adsorption column 14 passes downwardly therethrough as a compact unfluidized moving bed of adsorbent. At a point just above second lean gas disengaging zone 78 the cool lean adsorbent is divided into a first and second separate independent streams. The first stream of adsorbent passes downwardly through primary tube 114 through and independent of second separation zone 20 and discharges directly into primary separation zone 16 for passage therethrough. The second adsorbent stream passes directly through second lean gas disengaging zone 78 and through second separation zone 20 and then passes downwardly through and independent of first separation zone 16 through secondary tubes 116 and 118. The two separate streams of adsorbent are subsequently combined just above main rectification zone 102 and flow downwardly therefrom as a single combined stream. Obviously a plurality of these primary and secondary tubes may be employed, the number depending on the amount of adsorbent flowing.

The hot lean granular adsorbent is removed from bottom zone 112 through sealing leg 120 and passed through adsorbent flow control valve 122 which is actuated in accordance with level controller 124 to maintain a substantially constant adsorbent level in bottom zone 112. The granular adsorbent then passes through transfer line 126 into induction zone 128. Herein it is picked up and suspended in a recirculating stream of lift gas kept in motion by blower 130. The lift gas passes through line 132 at a recirculation rate controlled by valve 134 into induction zone 128 wherein a granular adsorbent-life gas suspension is formed. This suspension passes vertically through lift line 136 into adsorbent separator 138 wherein the granular solids are separated from the recirculating lift gas and passed through transfer line 140 into hopper zone 74. The separated lift gas is removed from the top of the column through line 142 and is recirculated through line 144 to lift gas blower 130. As will be discussed in more detail below, an accumulation of lift gas occurs in the lift gas cycle due to the passage of a purge gas through cooling zone 76. This accumulation is removed through line 146 at a rate controlled by valve 148 and is combined with the second lean gas removed from disengaging zone 78.

Returning now to the compressed cooled impure hydrogen-containing primary feed gas, this gaseous mixture is introduced through line 72 into first feed gas engaging zone 96 and passes upwardly countercurrent to the downwardly moving first stream of adsorbent in first adsorption zone 94. Herein the carbon dioxide, water vapor, and methane and more readily adsorbable constituents are adsorbed leaving hydrogen, oxygen, nitrogen if present, and carbon monoxide substantially unadsorbed as a first lean gas. The first lean gas is removed from first lean gas disengaging zone 92 through line 150 and constitutes the intermediate hydrogenation zone feed gas discussed below. The first rich adsorbent passes downwardly into first primary rectification zone 98. Herein the rich adsorbent is contacted with a reflux gas containing methane, carbon dioxide, water vapor, and more readily adsorbable constituents thereby preferentially desorbing residual traces of constituents of the first lean gas named above forming a first rectified adsorbent. The preferentially desorbed constituents pass upwardly and join the first lean gas described above. The first rectified adsorbent is subsequently treated as described below in main rectification zone 102 wherein the secondary reflux is desorbed therefrom. The first lean gas flowing through line 150 is preheated a substantial amount by absorbing the exothermic heat of adsorption liberated in first adsorption zone 194. This preheated gas is then passed through preheater 152, which may be one side of a heat interchanger permitting heat exchange with the hydrogenation zone effluent gases, and is raised to a temperature of from about 500° F. and 700° F. The heated gases then pass through line 154 into hydrogenation zone 18 wherein a catalytic hydrogenation of carbon monoxide, carbon dioxide, and oxygen if present, results. Part of the hydrogenation effluent may be recirculated through the hydrogenation zone to decrease the carbon monoxide content still further. The effluent gases flow through line 156 into cooler 158 in which the gases are cooled and refrigerated to a temperature of about 40° F. The cooled gases then flow through line 160 into separator 162 wherefrom the condensate is removed through line 164 controlled by valve 166. The cooled dehydrated hydrogenation zone effluent containing hydrogen, methane, nitrogen if present, and traces of water vapor then pass through line 168 as the second feed gas into feed gas induction zone 82.

This second feed gas passes from engaging zone 82 upwardly through second adsorption zone 80 countercurrent to the downwardly moving second stream of adsorbent. All the constituents of the gaseous mixture more readily adsorbable than hydrogen are adsorbed forming a second rich adsorbent and leaving substantially pure hydrogen as the second unadsorbed lean gas product or a hydrogen-nitrogen mixture if nitrogen is present. A portion of the hydrogen product is removed from disengaging zone 78 through line 170 at a rate controlled by back pressure regulator. The remaining portion of the unadsorbed gas passes upwardly through the tubes of cooler 76 as the purge gas referred to above and serves to desorb traces of adsorbed stripping gas from the hot lean adsorbent cooling therein. This purge gas is combined with the recirculated lift gas stream and an amount equal thereto is removed, as described above, through line 146 and is combined with the hydrogen lean gas product in line 170.

The hydrogen product leaves disengaging zone 78 at about 100° F., having been heated from 40° F. by the liberated heat of adsorption due to the very low relative flow rate of the second adsorbent stream.

The second rich adsorbent is countercurrently contacted with a more readily adsorbable reflux gas containing methane in first secondary rectification zone 84 thereby preferentially desorbing residual quantities of adsorbed hydrogen forming a second partially rectified adsorbent and the desorbed hydrogen joins the unadsorbed lean gas flowing through second adsorption zone 80.

The thus rectified adsorbent then passes into second secondary rectification zone 88 wherein it is contacted with a secondary reflux gas introduced through line 174 at a rate controlled by valve 176 in accordance with temperature recorder controller 178 actuated by thermocouple point 180 in contact with the adsorbent in rectification zone 88. The more readily adsorbable secondary reflux gas preferentially desorbs the adsorbed methane formed in hydrogenation zone 18 plus such methane which may have been present in the first lean gas removed from first separation zone 16. The preferentially desorbed methane passes upwardly in part into first secondary rectification zone 84 as reflux while the remainder is removed as a side cut gas product through line 182 at a rate controlled by valve 184 in accordance with temperature recorder controller 186 actuated by thermocouple 188 in contact with the adsorbent.

When this methane side cut product is to be recirculated, valve 190 is closed and the side cut gas product passes to gasification zone 10 through line 34 controlled by valve 36.

The fully rectified second adsorbent stream passes downwardly from the bottom of second secondary rectification zone 88 through secondary tubes 116 and 118 for combination with the first moving bed of adsorbent in main rectification zone 102. Herein the granular adsorbent is countercurrently contacted with a rich gas reflux thereby serving to desorb a somewhat less readily adsorbable secondary reflux gas, part of which passes into primary rectification zone 98 and the remainder of which passes into second secondary rectification zone 88 through line 174. This reflux gas contains carbon dioxide, water vapor, and sometimes methane, and more readily adsorbable constituents if present.

The combined rectified adsorbent then passes downwardly through the tubes of heating and desorption zone 106 wherein the adsorbent is indirectly heated and directly contacted with a stripping gas such as steam introduced through line 192 at a rate controlled by valve 194 into stripping gas engaging zone 108. The stripping gas passes upwardly countercurrent to the adsorbent desorbing residual adsorbed rich gas constituents which collect in rich gas disengaging zone 104. The rich gas passes in part as reflux into main rectification zone 102 while the remaining part is removed through line 196 at a rate controlled by valve 198 in accordance with temperature recorder controller 200 actuated by thermocouple 202 in contact with the adsorbent. The rich gas is cooled and steam is condensed by means not shown and passed to storage or further processing facilities not shown. The hot lean adsorbent is then recirculated to the top of column 14 wherein it is cooled, divided into the first and second streams of adsorbent, and passed again through the first and second separation zones referred to above.

It should be noted that in the operation of the selective adsorption process the methane and other hydrocarbon contaminants as well as the methane produced in hydrogenation zone 18 may be produced from the adsorption column at either one of two places. First, valves 184 and 176 may be closed in which case the methane in the primary feed gas is adsorbed in first adsorption zone 94 and passed into the heating zone. The methane formed in the hydrogenation zone 18 is adsorbed in secondary adsorption zone 80 and passed with the second stream of adsorbent from the second separation zone through tubes 116 and 118 into the heating and desorption zone. All the methane in the system is hereby produced with the rich gas product containing carbon dioxide and water vapor. Second, a pure methane side cut described above may be produced whereby the methane in the primary feed is left unadsorbed in primary adsorption zone 94 and passes with the hydrogen and carbon monoxide through the hydrogenation zone in which additional methane is formed. All the methane is then adsorbed in secondary adsorption zone 80 and is subsequently preferentially desorbed in second secondary rectification zone 88 to produce a methane side cut which may be recirculated to the gasification zone to produce more hydrogen and carbon monoxide.

As an example of the hydrogen purification process of this invention, the following data are given:

EXAMPLE

Natural gas containing about 90% methane is reformed with steam to produce hydrogen and carbon monoxide. The natural gas is mixed with steam in an amount equivalent to 2.5 moles of steam per mole of methane which is a 150% excess. The reforming pressure is 110 p. s. i. g. and the reformer outlet temperature is 1450° F. A supported nickel catalyst is used to promote the reaction between methane and steam. Supported platinum catalyst is also applicable. The reformer effluent gas on a dry basis has the following composition:

Table 1

| Component: | Mole percent |
|---|---|
| Hydrogen | 70.5 |
| Carbon monoxide | 16.6 |
| Carbon dioxide | 6.8 |
| Methane | 6.1 |
| | 100.0 |

The reformer effluent gas is mixed with additional steam, if necessary, to bring the ratio of steam to carbon monoxide present to a value of 1.0. This gaseous mixture is subjected to a water gas shift reaction at a pressure of 100 p. s. i. g. The reaction is promoted by a supported iron oxide catalyst and the outlet temperature is maintained at 775° F. The water gas shift converter effluent has the following composition on a dry basis:

Table 2

| Component: | Mole percent |
|---|---|
| Hydrogen | 75.0 |
| Carbon monoxide | 1.8 |
| Carbon dioxide | 17.7 |
| Methane | 5.5 |
| | 100.0 |

This gaseous mixture is cooled and the condensed water separted. The cooled effluent is compressed from about 90 p. s. i. g. to a pressure of about 120 p. s. i. g. and further cooled and is introduced into the first separation zone of a selective adsorption column as shown in the drawing. The carbon dioxide, water vapor and part of the methane, are adsorbed on the first adsorbent stream leaving the hydrogen, the major portion of the methane, and a minor part of the carbon dioxide unadsorbed as a first lean gas. The first lean gas is heated to a temperature of 600° F. and passed through the carbon monoxide hydrogenation zone in the presence of a supported platinum catalyst quantitatively hydrogenating the carbon monoxide and carbon dioxide to methane. The effluent is cooled and refrigerated to 40° F. and contacted with the adsorbent in the second separation zone producing an unadsorbed lean gas product of high purity hydrogen.

The 3 gas products from the selective adsorption column have the following compositions:

Table 3

| Component | Mole Percent | | |
|---|---|---|---|
| | Lean Gas | Side Cut Gas | Rich Gas |
| Hydrogen | 100 | 2.0 | |
| Carbon monoxide p. p. m. | 4 | | |
| Methane | | 94.5 | 1.6 |
| Carbon dioxide | | 3.5 | 98.4 |
| | 100 | 100.0 | 100.0 |

The side cut gas product containing higher concentration of methane than the feed gas is recirculated at 115 p. s. i. g. to the reformer for combination with fresh feed to produce additional quantities of hydrogen.

In the foregoing example the granular adsorbent employed is activated coconut shell charcoal having a mesh size of from 10 to 30.

The selective adsorption operation illustrated above is equally applicable to the reformer effluent, but is less preferable since a large proportion of the hydrogen is consumed in hydrogenating the carbon monoxide.

Further, the selective adsorption operation is equally applicable to a process as given in the example above except that instead of natural gas reforming, the well-known water gas generation process is performed on a solid carbonaceous fuel such as petroleum coke and in which the coke is alternately blown with air and with steam to produce a gaseous mixture containing carbon monoxide and hydrogen.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the production of high purity hydrogen which comprises reacting a carbonaceous material with steam at gasification conditions of temperature to produce a gasification effluent containing hydrogen and carbon monoxide, subsequently reacting said carbon monoxide with steam under water gas shift conditions of temperature to produce carbon dioxide and additional hydrogen, adsorbing carbon dioxide and more readily adsorbable constituents in a first adsorption zone leaving residual carbon monoxide and less readily adsorbable constituents including hydrogen unadsorbed, reacting said residual carbon monoxide with part of said hydrogen forming methane, adsorbing said methane in a second adsorption zone leaving pure hydrogen free of carbon monoxide unadsorbed as a product gas, and desorbing the constituents adsorbed in said first and second adsorption zones.

2. A process for pure hydrogen production which comprises reforming a hydrocarbon and steam in the vapor phase at a elevated temperature to produce hydrogen and carbon monoxide, subsequently converting at least part of the carbon monoxide to carbon dioxide and additional hydrogen through the water gas shift reaction with steam, passing a first and a second moving bed of solid granular adsorbent downwardly by gravity through a first and a second separation zone, contacting the water gas shift effluent with said first moving bed of adsorbent in said first separation zone thereby adsorbing the more readily adsorbable constituents forming a first rich adsorbent leaving hydrogen and residual carbon monoxide unadsorbed in a first lean gas, heating said first lean gas and hydrogenating said carbon monoxide to form methane in a hydrogenation zone, contacting the hydrogenation zone effluent with said second moving bed in said second separation zone thereby adsorbing said methane and more readily adsorbable constituents forming a second rich adsorbent leaving carbon monoxide-free hydrogen as a second lean gas process product, desorbing methane from said second rich adsorbent as a side cut gas, recirculating said methane for reforming with steam to produce additional hydrogen, then combining said first and second moving beds of adsorbent, desorbing adsorbed constituents therefrom as rich gas product, and recirculating said adsorbent as separate streams through said first and second separation zones.

3. A process for production of carbon monoxide-free hydrogen which comprises reforming a hydrocarbon and steam in a reforming zone at a temperature between about 1200° F. and about 2000° F. to produce a reformer effluent containing hydrogen and carbon monoxide, reacting the carbon monoxide in a water-gas shift zone with steam at temperatures between about 600° F. and about 1000° F. to produce a water gas shift effluent containing hydrogen, residual carbon monoxide, and carbon dioxide, cooling said latter effluent to approximately atmospheric temperature and separating steam condensate, recirculating a solid granular adsorbent downwardly by gravity through an adsorptive fractionation zone containing separate first and second separation zones, passing separate first and second streams of adsorbent respectively therethrough, contacting the cooled water gas shift effluent with said first adsorbent stream in said first separation zone thereby adsorbing the more readily adsorbable constituents leaving hydrogen and said residual carbon monoxide unadsorbed as a first lean gas preheated by the heat of adsorption of said more readily adsorbable constituents, further heating said lean gas to between about 400° F. and about 700° F., passing the heated gas through a carbon monoxide hydrogenation zone thereby converting said residual carbon monoxide to methane, cooling the hydrogenation zone effluent to a subatmospheric temperature, contacting it with said second stream of adsorbent in said second separation zone to adsorb said methane forming a second rich adsorbent and leaving carbon monoxide-free hydrogen unadsorbed as a product gas, preferentially desorbing said methane as a side cut gas by contacting said second rich adsorbent with a more readily adsorbable gas reflux, next desorbing adsorbed constituents as a rich gas product from the combined first and second adsorbent streams, recirculating the lean adsorbent thus formed, and returning the methane side cut gas to said reforming zone for reforming with said hydrocarbon.

4. A process according to claim 3 wherein said hydrocarbon and recirculated methane are reformed in said reforming zone in the presence of a nickel reforming catalyst, said carbon monoxide is reacted in said water gas shift zone in the presence of an iron oxide catalyst, and said residual carbon monoxide is hydrogenated in said hydrogenation zone in the presence of a platinum catalyst.

5. A process according to claim 3 wherein said reforming zone, said water gas shift zone, and said adsorptive fractionation zone are all operated at substantially the same pressure.

6. A process according to claim 3 wherein said first lean gas is preheated in said first separation zone prior to passing through said carbon monoxide hydrogenation zone by maintaining the product of the mass rate and the specific heat of the first lean gas at a value greater than the product of the mass rate and the specific heat of said first adsorbent stream whereby the exothermic heat of adsorption of said more readily adsorbable constituents is absorbed by and preheats said first lean gas.

7. A process according to claim 3 in combination with the step of reforming said hydrocarbon in the presence of nitrogen in a controlled amount to equal about 33.3% of the hydrogen in the second lean gas thereby producing a carbon monoxide-free second lean gas containing about 25% nitrogen and about 75% hydrogen as a synthetic ammonia process feed gas.

8. A process for the production of carbon monoxide-free hydrogen which comprises recirculating a solid granular adsorbent downwardly by gravity through an adsorptive fractionation zone containing separate first and second separation zones, passing separate first and second streams of adsorbent respectively therethrough, passing a gaseous stream of carbon monoxide-contaminated hydrogen into contact with said first adsorbent stream in said first separation zone thereby adsorbing the more readily adsorbable constituents leaving hydrogen and said residual carbon monoxide unadsorbed as a first lean gas, further heating said lean gas to between about 400° F. and about 700° F., passing the heated gas through a carbon monoxide hydrogenation zone thereby converting said monoxide to methane, cooling the hydrogenation zone effluent, contacting it with said second stream of adsorbent in said second separation zone to adsorb said methane forming a second rich adsorbent and leaving carbon monoxide-free hydrogen unadsorbed as a product gas, desorbing adsorbed constituents as a rich gas product from the combined first and second adsorbent streams, and recirculating the lean adsorbent thus formed.

9. A process for the production of hydrogen substantially free of carbon monoxide from an impure hydrogen stream which comprises passing a moving bed of solid granular adsorbent downwardly by gravity through an adsorbent cooling zone, dividing said moving bed of adsorbent into a first and second stream, passing said streams separately through a first and second separation zone respectively, subsequently combining said streams after passage through said separation zones, passing the combined stream through a heating and desorption zone, recirculating adsorbent therefrom to said cooling zone, passing said impure hydrogen stream into contact with said first adsorbent stream to adsorb the more readily adsorbable constituents leaving hydrogen, carbon monoxide, and less readily adsorbable constituents as a first unadsorbed lean gas, passing said first lean gas from said first separation zone through a hydrogenation zone, contacting said lean gas therein with a catalyst at carbon monoxide hydrogenation conditions thereby converting said carbon monoxide to methane forming a secondary feed gas, next contacting said secondary feed gas with said second adsorbent stream to adsorb methane and more readily adsorbable constituents leaving hydrogen unadsorbed as the carbon monoxide-free product, and desorbing adsorbed constituents from said combined streams of adsorbent in said heating and desorption zone as a rich gas product.

10. A process according to claim 9 in combination with the steps of desorbing said methane from said second adsorbent stream as a side cut gas product.

11. A process according to claim 9 in combination with the step of preheating said first lean gas prior to carbon monoxide hydrogenation by maintaining the mass rate times the specific heat of the first adsorbent stream at a value less than the mass rate times the specific heat of said first lean gas thereby absorbing the heat of adsorption liberated in said first separation zone in said first lean gas and preheating it.

12. A process according to claim 11 wherein said first lean gas is preheated to a temperature between about 400° F. and about 700° F. and contacted with a platinum catalyst in said hydrogenation zone to convert said carbon monoxide to methane.

13. A process according to claim 12 wherein said impure hydrogen stream contains carbon dioxide, water vapor, methane, and carbon monoxide; in combination with the steps of adsorbing carbon dioxide, water vapor, and more readily adsorbable constituents in said first separation zone leaving methane, hydrogen, and carbon monoxide unadsorbed as said first lean gas, subsequent to the carbon monoxide hydrogenation adsorbing the methane in said first lean gas together with methane formed in carbon monoxide hydrogenation and any more readily adsorbable constituents in said second separation zone leaving the pure hydrogen product unadsorbed, and subsequently desorbing said methane as a side cut gas product from said second adsorbent stream by contacting said stream with a more readily adsorbable reflux gas.

14. A process according to claim 9 in combination with the steps of maintaining the mass flow rate times the specific heat of said second adsorbent stream at a value less than the mass flow rate times the specific heat of said pure hydrogen product thereby heating said hydrogen product in said second separation zone, and cooling and refrigerating said secondary feed by an amount sufficient to maintain the temperature of said hydrogen product at about an atmospheric temperature.

15. An apparatus for producing carbon monoxide-free hydrogen which comprises a gasification means for reacting a carbonaceous material with steam to produce a crude mixture of carbon monoxide and hydrogen, a water gas shift converter in gas-receiving relation to said gasification means for reacting carbon-monoxide in said crude mixture with additional steam to form carbon dioxide and further hydrogen, a selective adsorption column, means for recirculating a moving bed of granular adsorbent downwardly therethrough, means therein for dividing said moving bed into a first and second separate streams to pass respectively through a first and a second separate separation section in said adsorption column, means for passing effluent gases from said shift means into said first separation section, a carbon monoxide hydrogenation reactor, means for passing unadsorbed gas thereinto from said first separation section, means for passing hydrogenation reactor effluent therefrom into said second separation section, and means for removing an unadsorbed carbon monoxide-free hydrogen product therefrom.

16. An apparatus for producing hydrogen free of carbon monoxide which comprises a hydrocarbon reforming reactor, means for introducing a hydrocarbon and steam thereinto, means for maintaining the temperature therein between about 1200° F. and about 2000° F. to produce hydrogen and carbon monoxide, a water gas shift reactor in gas receiving relation to said reforming reactor, means for maintaining the temperature therein between about 600° F. and about 1000° F., a vertical selective adsorption column containing separate first and second separation sections, means for recirculating a moving bed of solid granular adsorbent downwardly by gravity through said column, means therein for dividing said bed into a first and a second stream for passage respectively through said separation sections and subsequently forming a combined stream of adsorbent, means for cooling the shift reactor effluent, means for passing the cooled effluent into contact with the adsorbent in said first separation section, a carbon monoxide hydrogenation reactor, means for passing unadsorbed gas from said first separation section thereinto, means for maintaining a temperature between about 400° F. and about 700° F. therein, means for passing the hydrogenation reactor effluent into said second separation section and outlet means for carbon monoxide-free hydrogen as an unadsorbed gas therefrom.

17. An apparatus according to claim 16 in combination with a nickel catalyst contact mass disposed within said reforming reactor, an iron oxide catalyst contact mass disposed within said water gas shift reactor, and a platinum catalyst contact mass disposed within said hydrogenation reactor.

18. An apparatus according to claim 16 in combination with means for introducing a more readily adsorbable reflux gas into said second separation section, and means for recycling a side cut gas preferentially desorbed therein to said hydrocarbon reforming reactor for reconversion with steam.

19. An apparatus for producing carbon monoxide-free hydrogen from a crude mixture thereof which comprises a vertical selective adsorption column containing separate first and second separation sections, means for recirculating a moving bed of solid granular adsorbent downwardly by gravity through said column, means therein for dividing said bed into a first and a second stream for passage respectively through said separation sections and subsequently forming a combined stream of adsorbent, means for introducing the crude mixture into said first separation section to contact said first stream of adsorbent therein, a carbon monoxide hydrogenation reactor, means for passing unadsorbed gas from said first separation section thereinto, means for maintaining a temperature between about 400° F. and about 700° F. therein, means for passing the hydrogenation reactor effluent into said second separation section and outlet means for carbon monoxide-free hydrogen as an unadsorbed gas therefrom.

References Cited in the file of this patent
UNITED STATES PATENTS

| | | |
|---|---|---|
| 2,487,981 | Reed | Nov. 15, 1949 |
| 2,575,519 | Imhoff | Nov. 20, 1951 |
| 2,575,520 | Berg | Nov. 20, 1951 |
| 2,603,553 | Berg | July 15, 1952 |
| 2,688,374 | Berg | Sept. 7, 1954 |